United States Patent [19]
Hull

[11] 3,861,345
[45] Jan. 21, 1975

[54] BOAT BUMPER

[75] Inventor: Evan B. Hull, Northboro, Mass.

[73] Assignee: Multiform, Inc., Worcester, Mass.

[22] Filed: July 2, 1973

[21] Appl. No.: 375,327

Related U.S. Application Data

[63] Continuation of Ser. No. 161,710, July 12, 1971, abandoned.

[52] U.S. Cl. .............................................. 114/219
[51] Int. Cl. .......................................... B63b 59/02
[58] Field of Search ........................... 114/219; 9/14

[56] References Cited
UNITED STATES PATENTS

| | | | |
|---|---|---|---|
| 2,903,990 | 9/1959 | Brown | 114/219 |
| 3,183,875 | 5/1965 | Russell | 114/219 |
| 3,286,680 | 11/1966 | Caretta | 114/219 |
| 3,292,566 | 12/1966 | Russell | 114/219 |
| 3,498,252 | 3/1970 | Peacock | 114/219 |
| 3,661,359 | 5/1972 | Walker | 114/219 |

FOREIGN PATENTS OR APPLICATIONS

| | | | |
|---|---|---|---|
| 1,951,190 | 5/1970 | Germany | 114/219 |

*Primary Examiner*—Trygve M. Blix
*Assistant Examiner*—Gregory W. O'Connor
*Attorney, Agent, or Firm*—Norman S. Blodgett; Gerry A. Blodgett

[57] ABSTRACT

A boat bumper consisting of an assemblage of elements each of which is blow-molded of an elastomer plastic material. In general the device has an elongated element adapted to be suspended from one end and has an enlarged head at the other end so that at least one energy-absorbing ring element formed of a resilient water impermeable substance can be empaled on the elongated element and supported by the enlarged head.

8 Claims, 11 Drawing Figures

EVAN B. HULL
INVENTOR.

3,861,345

BOAT BUMPER

This is a continuation of application Ser. No. 161,710, filed July 12, 1971, now abandoned.

BACKGROUND OF THE INVENTION

In the past, boat bumpers have consisted of any type of material or item that happens to be readily available during a particular period. During sailing ship days, everything was made of hemp construction and so were the boat bumpers. Later, when automobiles were developing, discarded tires were often used and are still used by commercial fishing boats. When the plastics age with its new machines came along, boat bumpers were designed specifically for the purpose of protecting boats. Most of those presently available produce a linear-type of boat bumper in the form of an elongated cylinder. The average boat, large or small, requires two or three bumpers to protect the entire boat. Little bumpers are sandwiched between pilings have become useless in certain unusual docking situations. Very few docks are perfect for protecting the boat docked there, and ocean docking of big inboard motor boats is especially hazardous. Most docks are in very poor repair and a bumper that will protect large sections of the craft is needed, but it is not available with presently known boat bumpers. Those bumpers that are large enough to protect a boat from pilings are usually too large to store conveniently in the cabin of the boat. A typical bumper made as an elongated sausage of canvas stuffed with sawdust or the like deteriorates rapidly, is torn by nails on the dock, and becomes useless when the boat is docked in rough weather. These and other difficulties experienced with the prior art devices have been obviated in a novel manner by the present invention.

It is, therefore, an outstanding object of the invention to provide a boat bumper which is simple in construction, which is inexpensive to manufacture, and which is capable of a long life of useful service under adverse conditions.

Another object of this invention is the provision of a boat bumper formed of a plurality of hollow elements which may be arranged in various ways to solve various different docking problems.

A further object of the present invention is the provision of a boat bumper consisting of a number of elements which can be arranged in a compact unit for storage and take up very little space at that time.

It is another object of the instant invention to provide a boat bumper which cannot be torn by sharp edges and nails on a dock, which does not deteriorate in salt water and similar chemically active conditions, and in which there are no grommets to be crushed or torn out of the body of the bumper.

A still further object of the invention is the provision of a boat bumper which is blow-molded of an elastomer plastic, which has a very pleasing appearance, and retains that appearance even after hard usage.

Another object of the invention is the provision of a boat bumper in the form of a plurality of differently shaped elements, each of which has a specific use in docking, the elements being capable of being interlocked for storage.

With these and other objects in view, as will be apparent to those skilled in the art, the invention resides in the combination of parts set forth in the specification and covered by the claims appended hereto.

SUMMARY OF THE INVENTION

In general, the invention consists of a boat bumper having an elongated element adapted to be suspended from one end and having an enlarged head at the other end and having at least one energy-absorbing ring element formed of a resilient, water-impermeable substance impaled on the elongated element and resting against the head.

More specifically, a plurality of ring elements are carried on the elongated element. The element and the bodies are each blow-molded from an elastomer plastic so as to be hollow.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
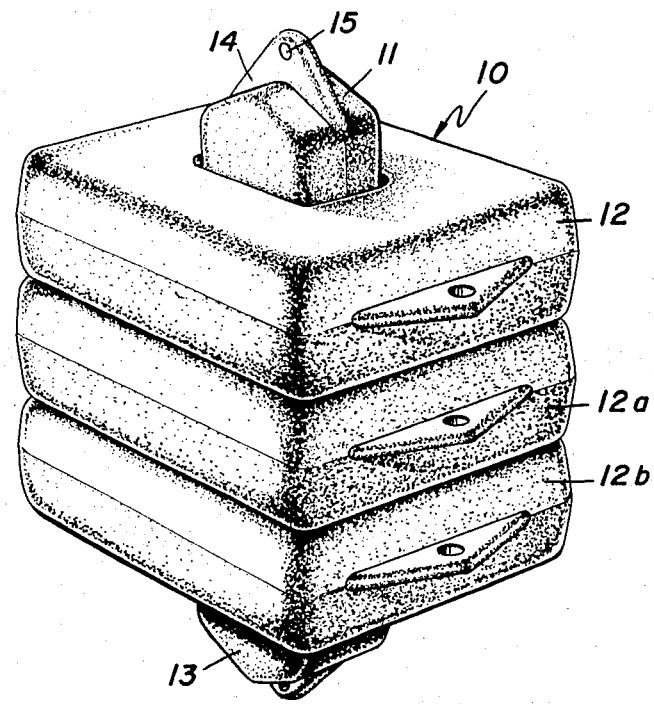
FIG. 1 is a perspective view of a boat fender embodying the principles of the present invention.
Figure 3:
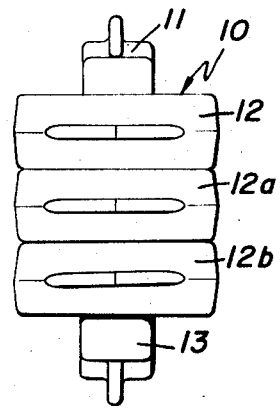
FIG. 3 is a side elevational view of the fender.
Figure 2:
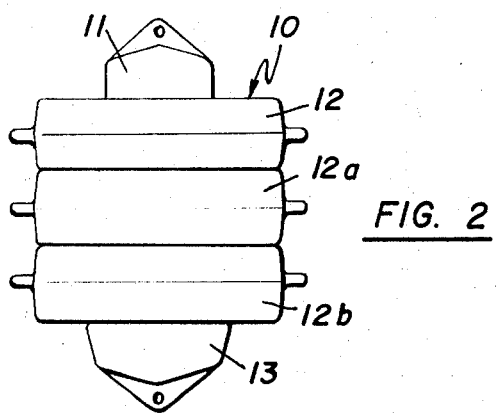
FIG. 2 is a front elevational view of the fender.
Figure 5:
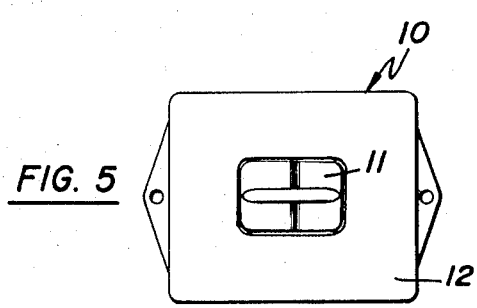
FIG. 5 is a plan view of the fender.
Figure 4:
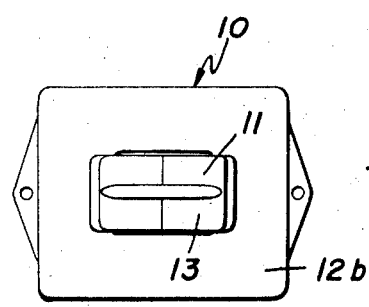
FIG. 4 is a bottom view of the fender.

Referring to FIGS. 1, 2, 3, 4, and 5, which best show the general features of the invention, the boat fender, indicated generally by the reference numeral 10, is shown as consisting of an elongated element 11 carrying three ring elements 12, 12a, and 12b. The elongated element 11 is adapted to be suspended from one end and has an elongated head 13 at the other end. Each ring element 12, 12a, and 12b is formed of a resilient, water-impermeable substance, is impaled on the elongated element 11 and the stack rests against the head 13. The elongated element 11 and the ring elements 12, 12a, and 12b are each formed by the blow-molding process from an elastomer plastic so as to be hollow.

Figure 6:
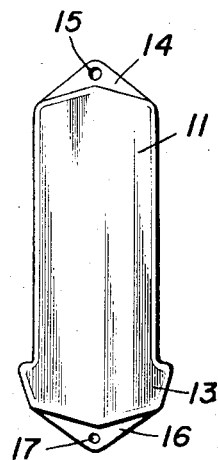
FIG. 6 is a front elevational view of an elongated element forming part of the fender.
Figure 7:
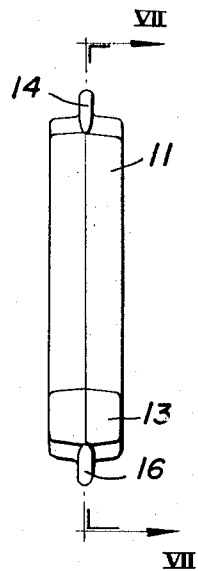
FIG. 7 is a side elevational view of the elongated element.
Figure 8:
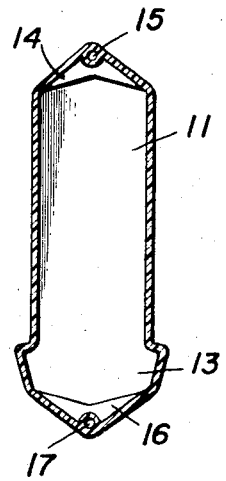
FIG. 8 is a sectional view of the elongated element taken on the line VIII—VIII of FIG. 7.

Referring to FIGS. 6, 7, and 8, which show the details of the elongated element 11, it can be seen that the upper end has a tab 14 with an aperture 15 extending through it. The lower end or head 13 is also provided with a tab 16 through which extends an aperture 17. Each tab is hollow and the hollow communicates with the main cavity, the aperture is defined by an annular surface joined to the opposite side of the tab.

Figure 9:
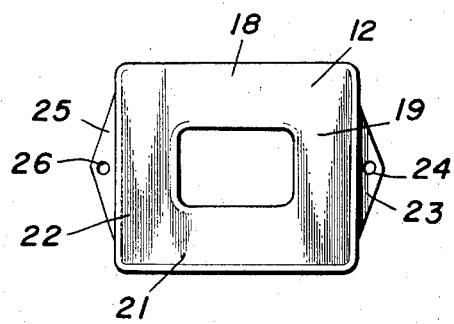
FIG. 9 is a front elevational view of a ring element forming another part of the fender.
Figure 10:
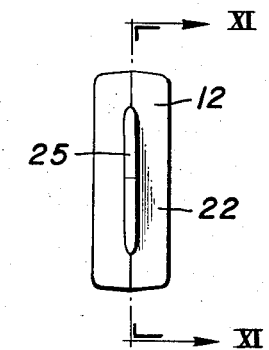
FIG. 10 is a side elevational view of the ring element.
Figure 11:
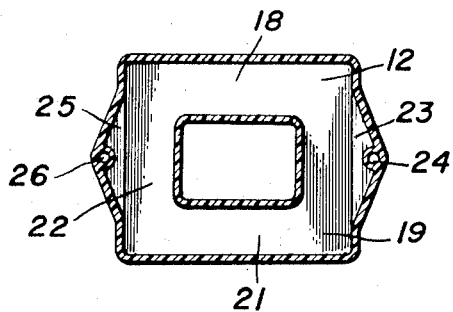
FIG. 11 is a sectional view of the ring element taken on the line XI—XI of FIG. 10.

Referring to FIGS. 9, 10, and 11, it can be seen that the ring element 12 (which is exactly like the ring elements 12a and 12b) is in the form of a polygon having a plurality of side members connected seriatim, each member being hollow. More specifically, the ring element is in the form of a rectangle having four side members 18, 19, 21, and 22. The side member 19 is provided with a tab 23 having an aperture 24, while the opposite side member 22 has a tab 25 having an aperture 26. As in the case of the elongated element 11, each tab is hollow. The hollow or tab cavity opens into the main cavity and each aperture is defined by an annular surface joined to the opposite side surfaces of the tab.

The operation of the invention will now be readily understood in view of the above description. With the boat fender 10 in the condition shown in FIG. 1, it is in condition either for storage or for use as a large boat fender or bumper. For storage, it will be suspended from the tab 15 by means of a rope through the aperture 14. It can never be hung from the side of the boat clear of the water or from the ceiling of the cabin. In this condition, all of the elements 11, 12, 12a and 12b are assembled together in one place and are quite compact. Its appearance is not lacking in a certain degree of beauty and is something of which the boat owner can be proud. If suspending it from the tab 15 is not desirable for some reason, it is possible to lay the entire assemblage on one side. The rectangular shape of the ring elements 12, 12a and 12b prevent it from rolling and make it a stable assemblage to lie on top of the cabin roof or similar location. When used as a bumper, the assemblage would also be suspended from the tab 15 and the element 11, along with the ring elements 12, 12a and 12b, make up a large flexible buoy. The use of the elastomer plastic with the hollow center means that the buoy is capable of absorbing very large shocks.

When the mooring problem is such that a number of smaller fenders are necessary, the assemblage is taken apart and the elements 11, 12, 12a and 12b used separately. The elongated element 11 shown in FIG. 6 would be suspended either from the tab 15 by means of a rope loop through the aperture 14 or by the tab 16 through a rope loop through the aperture 17. By use of both loops it is possible to arrange the elongated element horizontally, that is, parallel to the waterline, thus permitting an elongated fender when the side of the boat is moving back and forth along a dock having a protruding vertical tiling. The ring element 12 may be used in somewhat the same way. The tabs 23 and 25 are provided with rope loops through the apertures 24 and 26. The rectangular ring-like element 12 can be suspended from either end; by use of both loops, it can be suspended so it extends in a horizontal direction.

It can be seen, therefore, that the present invention can be used to solve a large number of difficult docking situations. With the elements keyed together, one gains greater bulk size without the inconvenience of permanent bulk size. On the other hand, with the stacking capabilities, the fenders stow on board easier and more conveniently. The use of the one-piece molded vinyl means that the fender is impervious to oils, solvents, gasoline, or harbor pollutants. It is permanently factory-sealed with no grommets or valves to pop or fail.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A boat bumper, comprising
   a. an elongated, hollow element formed of elastomer, possessing both bouyancy and shock absorbency, adapted to be suspended from one end, and having an integral enlarged head only at the other end, and
   b. at least one energy-absorbing ring element formed of a resilient, water-impermeable substance having a central passage through which the elongated element extends, the ring being capable of passing over all of the element except the enlarged head, and being bouyant and shaped to be suitable as a life ring, the said one end of the elongated element and an outer part of the ring element being provided with an apertured ear for suspension and use as a bumper, wherein the bumper can be easily transformed from a first, stored state in which the ring element is about the elongated element and the combination is usable as a bumper, to a second, separated state in which the elongated element and the ring element are usable separately as bumpers.

2. A boat bumper as recited in claim 1, wherein each element is provided with a tab having an aperture for its suspension, each tab being hollow with the hollow communicating with a main cavity, the aperture being defined by an annular surface joined to the opposite side surfaces of the tab.

3. A boat bumper as recited in claim 2, wherein each element is provided with another apertured tab located at a position remote from the position of the first mentioned tab.

4. A boat bumper as recited in claim 1, wherein the ring element is in the form of a rectangle having four side members, each element being hollow.

5. A boat bumper as recited in claim 1, wherein the ring element is in the form of a polygon having a plurality of side members connected seriatim, each element being hollow.

6. A boat bumper as recited in claim 1, wherein a plurality of passages extend entirely through the ring element for use with a flexible connecting and hanging element.

7. A boat bumper as recited in claim 1, wherein each end of the elongated element is provided with a tab having an aperture for its suspension, each tab being hollow with the hollow communicating with the main cavity, the aperture being defined by an annular surface joined to the opposite side surfaces of the tab.

8. A boat bumper as recited in claim 5, wherein the elongated member has a polygonal shape corresponding to that of the ring element so that the ring element is not rotatable on the elongated element.

* * * * *